United States Patent [19]

Thomas

[11] 4,403,596
[45] Sep. 13, 1983

[54] STRONG CANTILEVERED PARK GRILL

[75] Inventor: Craig R. Thomas, Cherokee, Iowa

[73] Assignee: R. J. Thomas Manufacturing Co., Cherokee, Iowa

[21] Appl. No.: 350,988

[22] Filed: Feb. 22, 1982

[51] Int. Cl.³ .................. A47J 37/00; F16M 13/00
[52] U.S. Cl. ........................ 126/25 A; 126/30; 126/29; 248/551
[58] Field of Search ............ 126/9 R, 9 A, 9 B, 14, 126/25 R, 25 A, 25 AA, 27, 29, 30, 41 R, 41 A, 41 E; 248/551; 292/225, 227

[56] References Cited

U.S. PATENT DOCUMENTS

| | | | |
|---|---|---|---|
| 2,033,898 | 3/1936 | Krebs | 126/29 |
| 2,425,036 | 8/1947 | Howe | 126/30 |
| 2,530,166 | 11/1950 | Johannsen | 126/25 |
| 2,827,846 | 4/1962 | Karkling | 126/29 |
| 3,027,887 | 4/1964 | Krohncke | 126/25 A |
| 3,053,345 | 9/1962 | Beller | 126/25 A |
| 3,070,084 | 12/1962 | Gier | 126/25 R |
| 3,119,387 | 1/1964 | Beller | 126/25 A |
| 3,298,361 | 1/1967 | Clark | 126/25 R |
| 3,304,929 | 2/1967 | Brunig | 126/25 R |
| 3,364,913 | 1/1968 | Borglum | 126/25 A |
| 3,373,731 | 3/1968 | Shook | 126/30 |
| 3,404,672 | 10/1968 | Arntz | 126/25 A |
| 3,455,291 | 7/1969 | Glass | 126/29 |
| 3,459,171 | 8/1969 | Swanson | 126/25 A |
| 3,583,385 | 6/1971 | Beller | 126/25 A |
| 3,641,922 | 3/1972 | Nachazel | 126/25 A |
| 4,146,010 | 3/1979 | Manska | 126/30 |

FOREIGN PATENT DOCUMENTS 1061379  4/1954  France ..................... 126/9

Primary Examiner—Samuel Scott
Assistant Examiner—G Anderson
Attorney, Agent, or Firm—Zarley, McKee, Thomte, Voorhees & Sease

[57] ABSTRACT

An outdoor park grill of superior strength and resistance to wear, vandalism and deformation stress which is comprised of a firebox, and a grate which covers the firebox which is wholly adjustable. The adjustability of the grate is provided by attachment of the grate to a pair of spaced apart vertically oriented grate posts attached to the bottom of the firebox and extending upwardly out of the box and looping around to engage the back wall of the firebox. The grate extends over the firebox and is defined by a pair of spaced apart grate sidebars and front and rear bars extending between the side bars and a plurality of rack bars, with the grate bars having a front handle portion and a rear eyelet which slidably engages the grate posts and also dwells in a different plane than the rack bars to provide a combination of compression and tension in a truss-like arrangement when downward pressure is placed on the grate handles.

8 Claims, 7 Drawing Figures

STRONG CANTILEVERED PARK GRILL

BACKGROUND OF THE INVENTION

This invention relates to outdoor park grills for use in recreation areas for cooking and otherwise preparing foods.

Outdoor cooking has enjoyed great popularity for many years. County, state and national park services often provide outdoor cooking grills for use by those participating in the recreation of the parks. Such grills are a tremendous convenience to the recreation enthusiasts, and also a considerable convenience to the park administrators in that they assure that fires, and the accompanying mess, are confined to certain areas.

Necessarily, such park grills are completely open and exposed to weathering, and often the subject of vandalism, as well as unusual stresses placed upon them by children using them for "swinging and climbing" obstacles.

It is therefore an object of the present invention to provide a park grill which is of superior strength, which is resistant to wear and vandalism, and which can withstand unusual deformation stresses when the grill is abused.

It is also an object of the present invention to provide a grill as described above which allows for complete adjusting of the distance between the hot coals and the park grill grate.

It is yet a further object of the present invention to provide a park grill which can be securely but rigidly attached to an upstanding post in a manner which prevents easy access to the locking mechanism so that the grill cannot be easily stolen.

A still further object of the present invention is to provide a grill which, even after exposure to weather, rusting and the like, is still easily adjustable without the naturally occurring rusting process interferring with its adjustability.

A yet further object of the present invention is to provide a grill which is completely 360° rotatable about its attaching pedestal so that the grill may be moved by the user in order to accomodate shifts in wind direction.

A yet additional object of this invention is to provide a grill which resists deformation and transfers any bending moments to the base which is adequately strong and will not bend.

A still further object of the present invention is to provide a grill which locks the grate directly to the firebox in a manner in which the grate cannot be easily removed from the unit, thereby abating theft of the grill.

And, another object of the invention is to provide a grill which employs an attaching locking mechanism which can be utilized without the need for any special tools by the installer.

An additional object is to provide a locking mechanism for the grill to the pedestal which is used in combination with the above described features which shields the locking mechanism from most environmental wear and which is very unlikely to become unserviceable and not allow rotation of the grill after rusting.

The method and manner of accomplishing each of the above objectives, as well as other advantages inherent in the structure, will be apparent from the detailed description of the invention which follows.

SUMMARY OF THE INVENTION

This invention relates to an outdoor park grill of superior strength, resistance to wear, resistance to vandalism and resistance to deformation stress. These primary advantages are achieved by a specially designed adjustable grate which is attached to a pair of spaced apart vertically oriented grate posts which are themselves attached to the bottom of the firebox and extend upwardly, loop out of the firebox and attach to the back wall of the firebox. The grate is defined by a pair of spaced apart grate side bars and front and rear bars extending between them. The grate side bars have a front handle portion and a rear eyelet, which slidably engages the grate posts and dwells in a different plane than the grate rack bars to provide a bridging or truss-like tension when downward pressure is placed on the grate handles. The result is a resistance to bending of either the grate handles or the vertically oriented grate posts.

The invention also relates to the above in combination with a superior lock mechanism which is not subjected to environmental conditions, and which, once locked in place, provides for a swivel locking mechanism for 360° rotation of the grill, and which is not accessible to users for convenient unlocking of the grill and removal from its pedestal attachment.

DETAILED DESCRIPTION OF THE PREFERRED EMBODIMENT

The park grill, referred to generally at 10, is comprised of a firebox, referred to generally at 12, with the firebox having a bottom 14, a pair of upstanding spaced apart sidewalls 16 and 18, and an adjoining rear wall 20.

Figure 1:
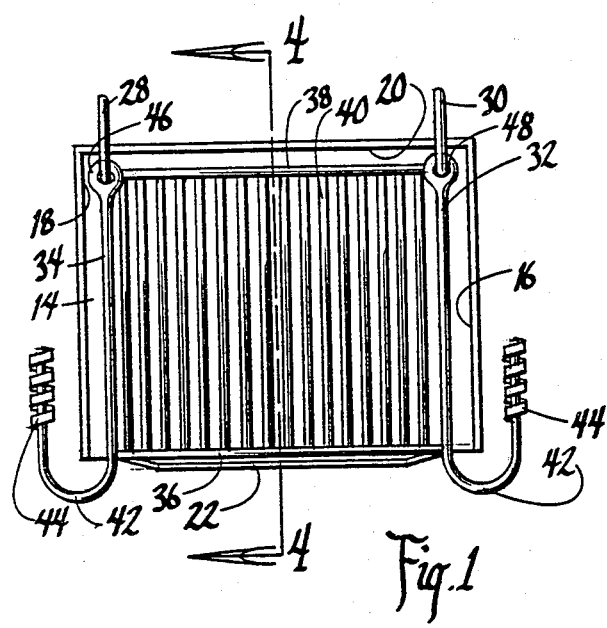
FIG. 1 is a plan view of the park grill of this invention.
Figure 2:
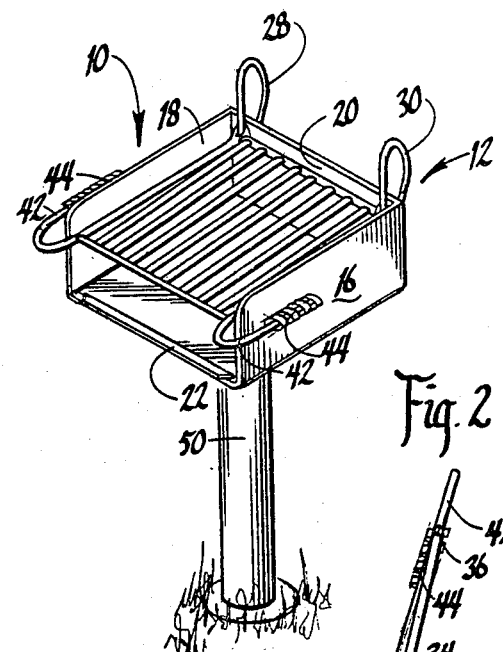
FIG. 2 is a perspective view of the grill.
Figure 3:
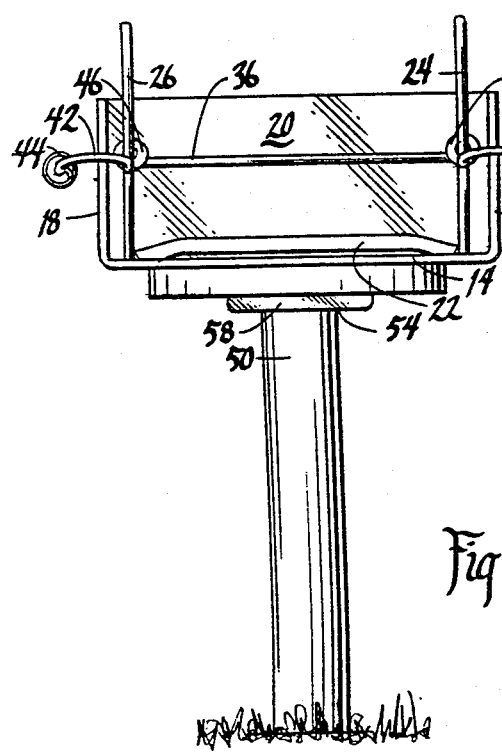
FIG. 3 is a front elevational view of the grill.

The front of the box, as can be seen particularly in FIG. 2, is open with an ash bar 22 partially extending across the open front to prevent ashes from spilling on the ground.

A pair of spaced apart vertically oriented grate posts 24 and 26 are attached to the bottom 14 of the box and extend upwardly parallel to rear wall 20 above the box and loop over, with the loop portions being shown for descriptive purposes, as 28 and 30, respectively, which terminate by attachment to the rear exterior surface of the firebox rear wall 20.

As will be explained hereinafter, it is highly preferred for purposes of the present invention, that grate post 24 and 26 are made of round steel stock of substantially the same dimensions as the grate sidebars which will be next described.

An adjustable grate extends over the firebox and is defined by a pair of spaced apart grate sidebars 32 and 34 and front and rear grate bars extending therebetween, 36 and 38. A plurality of spaced apart rack bars 40 extend between front and rear grate bars 36 and 38.

Figure 4:
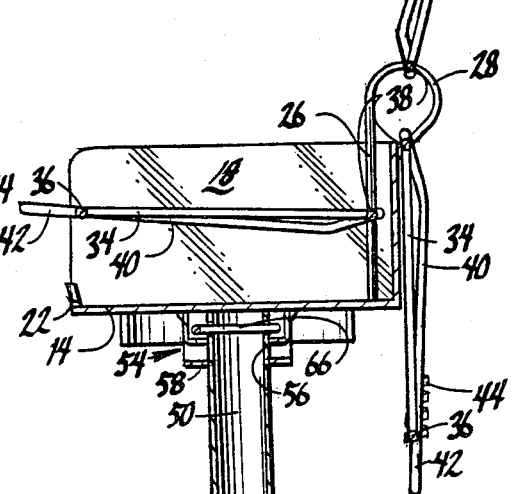
FIG. 4 is a sectional view about line 4—4 of FIG. 1.
Figure 4:
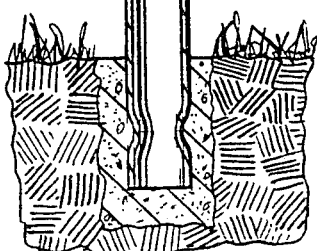
Figure 5:
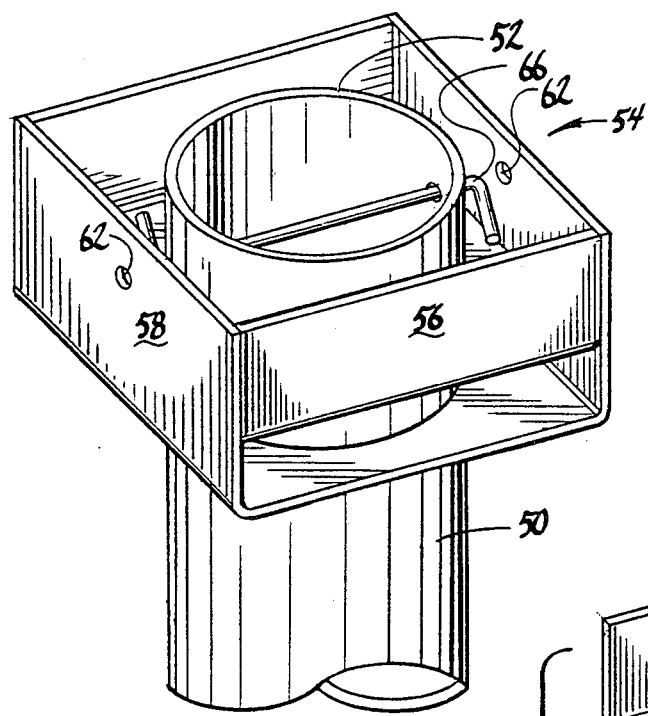
FIG. 5 is a perspective view of the pedestal attaching and locking mechanism.

Turning now to a more detailed description of the grate sidebars 32 and 34, as can be seen from the drawings, each of the bars are of like configuration. The sidebars 32 and 34 have a generally U-shaped front handle portion 42 which extends out of the box and is bent rearwardly and terminates with grippers 44. At the rearward end of the grate sidebars 32 and 34, each has a rear eyelet 46 and 48, respectively, which loops around and grasps the vertical support posts 24 and 26. As perhaps best seen in FIGS. 2 and 4, the eyelet 46 and 48 dwells in a slightly inclined plane from the remaining portion of sidebars 32 and 34. Likewise, as best seen in FIG. 4, grate bars 40 dwell in a substantially flat plane slightly above the sidebars 32 and 34. As a result of this important relationship, downward pressure on handles 44 is somewhat resisted by the compression tension pressure relationship between sidebars 36 and 38 and the grate bars 40, such that compression forces are applied against grate sidebars 32 and 34 with the grate bars 40 acting like a supporting truss. Thus, the unit is capable of withstanding the entire body pressure of a normal person if they use the handles to lift their body off of the ground, as often may happen with children. Additionally, if the unit is used in such a manner by children, the stress on the grate posts 24 and 26 is not only supported by the post itself, but also in part transferred to the rear wall 20, due to the fixed relationship between the bottom of the firebox, on the one hand, and the exterior side of the rear wall 20 on the other hand.

It can be seen that the grate will provide for complete adjustability with regard to its dimension relationship with the bottom of the firebox 14 by simply grasping handles 44 and moving the grate up or down grate post 24 and 26 which will serve to position the grate at any vertical orientation desired by a cantilevered jamming or binding relationship between the eyelets 46 and 48 and posts 24 and 26. If desired, the grate can be moved to a completely substantially vertical position as illustrated in FIG. 4 or it can be moved all the way around to an at-rest complete back position as depicted in FIG. 4.

It is highly preferred and in some cases essential that the grate sidebars 32 and 34 and the grate posts 24 and 26 be made of similarly dimensioned round steel stock. The curved surface of the round material at the eyelets 46 and 48 are less susceptible to deterioration due to use and exposure in the outdoor environment than the sharp edges of mechanisms previously used in the art. The shape of the eyelets 46 and 48 make them self-aligning on the vertical column or posts 24 and 26, allowing them to "slip lock" more reliably as the grate is allowed to tip forward and become level and rigidly engage there because of the downward pressure naturally associated with the weight of the grate. This also provides a superior slip lock mechanism which allows smooth adjustment without any jerking or erratic movements, is less susceptible to jamming, and is perhaps one of the simplest manners to achieve the infinite adjustment ability for the grate itself.

The fact that the grate support posts 24 and 26 are rigidly and securely engaged to both the bottom wall of the firebox and the exterior rear wall of the firebox 20 means that vandals cannot remove the grate and carry it away.

There are numerous ways in which the basic grill design may be mounted for use. However, a highly preferred way is depicted with use of the single pedestal mount shown in the drawings. There, it can be seen that a pedestal 50 is ground supported at one end, and extends upward and terminates at a top end 52. Pedestal 50 is generally tubular in nature.

Welded to the central portion of the bottom of firebox 14 is a lock box enclosure 54. Lock box 54 is comprised of two U-shaped members 56 and 58, each with a central aperture of like dimensions 60, such that it will allow pedestal 50 to pass therethrough. One of the U-shaped bracket-like pieces 58 has side apertures 62. The side apertures are of the same dimension as the holes 64 bored, one across from the other along a diameter of the pedestal 50 adjacent the pedestal top 52.

Figure 6:
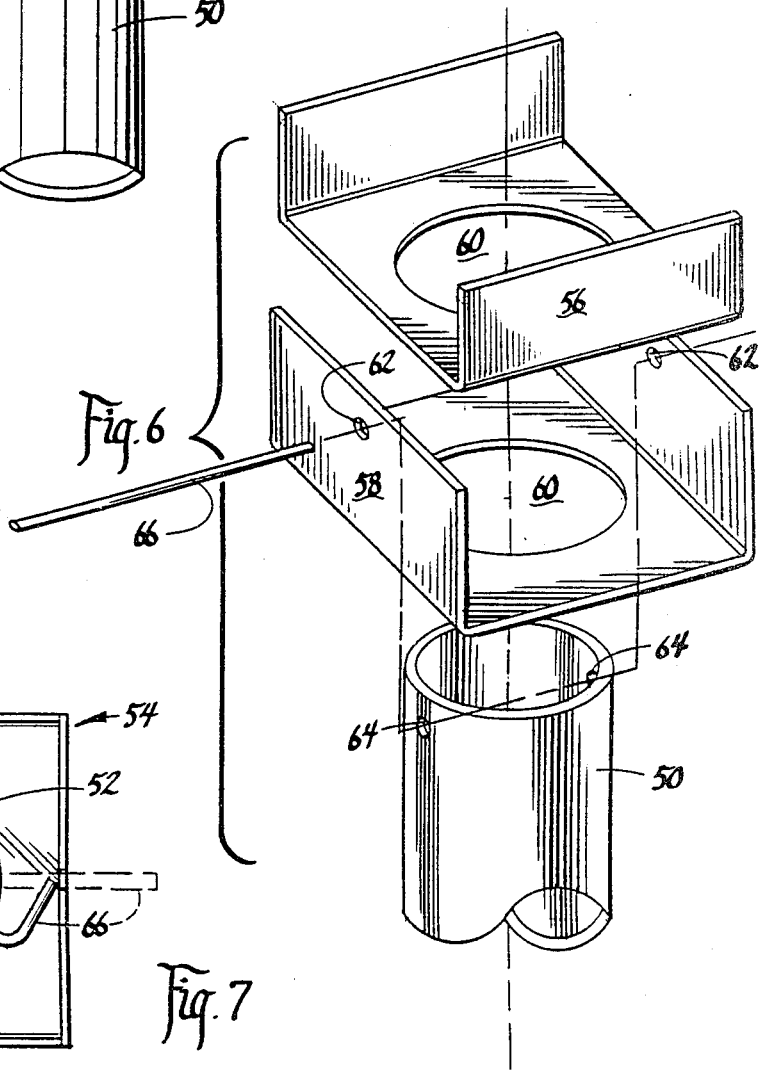
FIG. 6 is an exploded view of the component parts of the locking mechanism.
Figure 7:
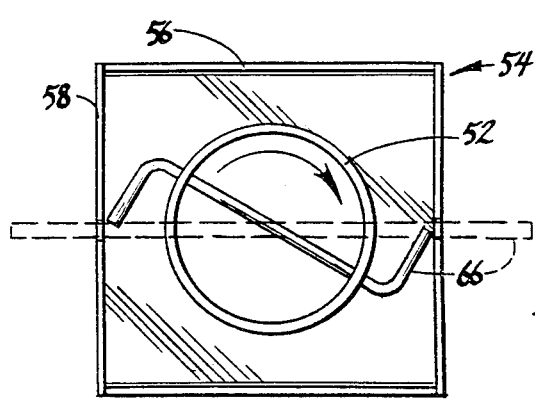
FIG. 7 is a plan view of the locking mechanism, illustrating how the mechanism is locked.

The lock box enclosure 54 is put together, as depicted in FIG. 6, by simply turning one of the U-brackets 90° with respect to the other end inserting them together to define the box which is welded to the bottom 14 of the firebox. Thereafter, the firebox with the lock box enclosure is inserted over the pedestal top 50 and turned so that apertures 62 of the lock box and aperture 64 of the pedestal align. Pin 66 is inserted through the aligned apertures as depicted in dotted line relationship in FIG. 7. After insertion of pin 66, park grill 10 is firmly grasped, and twisted in accordance with the directional arrow of FIG. 7. The result is that pin 66 is yieldably distorted because of the twisting pressure and draws inside of lock box 52 is a sort of wrap around relationship with the top 52 of pedestal 50. The pin is no longer accessible after locking. Thus, it can be seen that the grill cannot be removed from the top of the pedestal. And, yet the grill can be conveniently rotated about the longitudinal axis of the pedestal 50 for positioning conveniently with respect to any wind direction. Generally, it has been found that if pin 66 is from about one-half to about one inch protruding on each side of lock box 54, the desired result is obtained.

Turning now, back to handle portions 42 and grippers 44 of grate sidebars 32 and 34. It has been found desirable if the U-shaped handle portion bends back and returns toward vertical pedestal 50 a distance which is at least as great as one-half of the distance between the front edge of firebox side walls 16 and 18, and the longitudinal axis of pedestal 50. If this is so, the location of the handle portion and grippers 42 and 44, respectively, to the vertical column of pedestal 50 significantly reduces the moment arm about the column, thereby reducing the ability of a vandal to exert downward pressure in an attempt to vandalize the grate by forcing the handles down. This is therefore a preferred aspect.

It therefore can be seen that the invention accomplishes at least all of its stated objectives. The unit is weather resistant, is serviceable, can be rotated for convenient change in wind direction, is infinitely adjustable with respect to the grate and the firebox, provides for significantly reduced deformation stress when the unit is used as a play object by children, provides for a grate which cannot be removed and stolen, and provides for a unit which is substantially weather resistant and smooth acting in use.

What is claimed is:

1. An outdoor park grill of superior strength and resistance to wear, vadalism and deformation stress, comprising:
   a firebox having a bottom, a pair of spaced apart sidewalls, a back wall and an open front;
   a pair of spaced apart vertically oriented grate posts attached to said bottom and extending upwardly out of said firebox and looping around to engage the backwall of said firebox;

an adjustable grate for extension over the firebox defined by spaced apart grate sidebars and front and rear bars extending between said sidebars, and a plurality of rack bars extending therebetween;

said grate sidebars having a front handle portion and a rear eyelet which slidably engages said grate posts and also dwells in a different plane than said rack bars to provide a combination of compression and tension when downward pressure is placed on said handle portions.

2. The park grill of claim 1 wherein said grate posts and said grate sidebars are both made of round stock.

3. The device of claim 2 wherein said handle portion of said grate sidebar is a U-shaped extension of said sidebar which extends out of said open front of said firebox and bends back rearwardly towards the rear of said box.

4. The device of claim 1 wherein said firebox bottom is rotatably but securely attached to the top of a vertically extending pedestal, with the pedestal bottom fixed to the ground.

5. The device of claim 4 wherein handle portion extends rearwardly at least one-half of the distance between the front of the firebox and the pedestal to reduce the moment arm about the pedestal.

6. The device of claim 4 wherein said rotatable but secure attachment between said pedestal top at the bottom of said firebox is provided by a locking mechanism, accessible upon installation of said grill, but no longer physically accessible after installation.

7. The device of claim 6 wherein said locking mechanism is a box enclosure attached to the bottom of said firebox having a bottom wall, and sidewalls, said bottom having an opening for insertion of said pedestal, with two of said sidewalls having pin insertion apertures which may be aligned with a pin insertion aperture near the top of said pedestal to allow insertion of a yieldable pin, which upon twisting of said grill yieldably deforms around the pedestal and inside of said box enclosure.

8. The device of claim 1 wherein the open front of said firebox has an ash bar extending across it.

* * * * *